United States Patent [19]

Breckenfelder

[11] Patent Number: 4,609,583

[45] Date of Patent: Sep. 2, 1986

[54] RUBBER BUMPER STRIP

[75] Inventor: Ernst G. Breckenfelder, Elmhurst, Ill.

[73] Assignee: UIP Engineered Products Corporation, Addison, Ill.

[21] Appl. No.: 380,568

[22] Filed: May 21, 1982

[51] Int. Cl.[4] .................................................. B32B 3/10
[52] U.S. Cl. ...................................... 428/140; 428/174
[58] Field of Search ................. 428/31, 139, 140, 174, 428/179; 24/289, 297, 294; 52/716–718; 293/121

[56] References Cited

FOREIGN PATENT DOCUMENTS 477004 1/1953 Italy .................................... 428/140

*Primary Examiner*—Alexander S. Thomas
*Attorney, Agent, or Firm*—Ronald E. Barry

[57] ABSTRACT

A rubber bumper mounting strip for an asphalt shingle cutting cylinder including a metal backing strip having a number of mounting sections interconnected by narrow perforated bridges and being offset from the plane of the mounting sections and a rubber bumper molded to the backing strip with the bridges encapsulated in the rubber bumper.

3 Claims, 7 Drawing Figures

RUBBER BUMPER STRIP

BACKGROUND OF THE INVENTION

Asphalt roofing shingles are cut from a web of asphalt roofing material by cutting cylinders having knives located on the surface of the cylinder. Rubber mounting strips are mounted on the cylinders in a parallel relation to the cutting knives to strip the asphalt material from the knife after it has been cut. The mounting strips are also used to provide traction on the incoming web of asphalt material to thereby maintain a uniform length to the asphalt shingles.

The mounting strips generally consist of a metal backing strip having a series of holes throughout the length for securing the mounting strip on the cylinder. A rubber bumper is vulcanized to the suface of the metal backing strip. In practice it has been found that the ability of the mounting strip to perform its function is predicated on the reliability of the bond or adhesion of the rubber to the metal backing strip. Failure, generally, occurs either due to poor bonding of the rubber bumper to the backing strip or where the bond breaks down due to excessive stress.

SUMMARY OF THE INVENTION

The mounting strip according to the present invention, provides the same functions as the the original mounting strip but eliminates the causes of failure noted above. This has been accomplished by utilizing a metal backing strip having a series of mounting sections located at spaced intervals and connected by narrow bridges offset from the plane of the mounting sections. The rubber bumper is molded to the backing strip with the narrow bridges encapsulated within the rubber bumper. A bond is formed during the molding process between the metal strip and the rubber bumper with the bridges encapsulated in the rubber to increase the strength of the bond.

THE DRAWINGS

DESCRIPTION OF THE INVENTION

Figure 1:
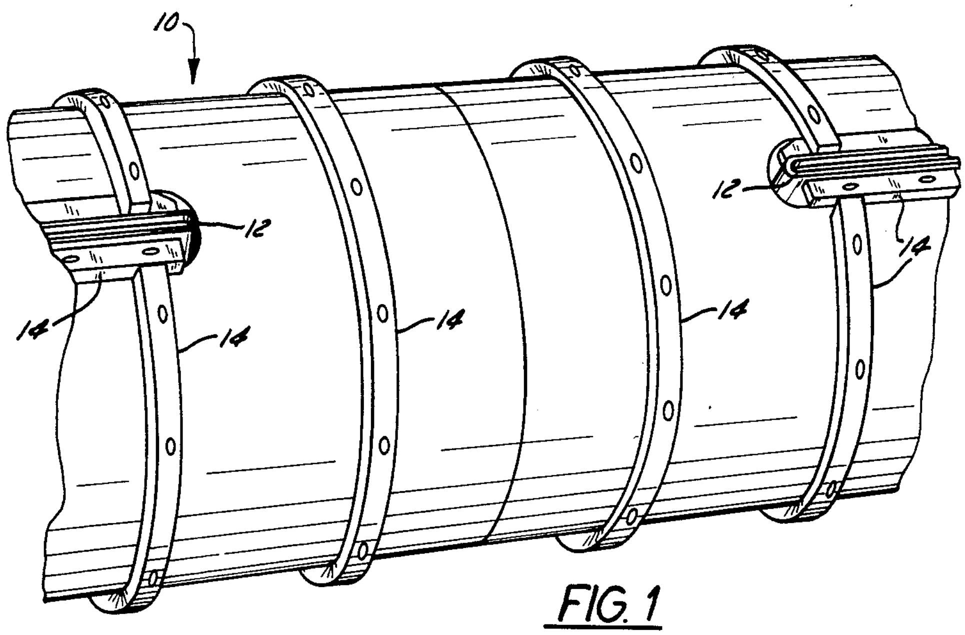
FIG. 1 is a perspective view of a portion of an asphalt cutting cylinder showing the rubber mounting strips mounted on the cylinder.

Referring to FIG. 1 of the drawings, an asphalt shingle cutting cylinder 10 is shown having a number of knives 12 mounted on the surface of the cylinder. Rubber bumper strips 14 are shown mounted in a parallel spaced relation to knives 12 as well as around the periphery of the cylinder 10. The bumper strips are located adjacent to the cutting knives and are used to strip the asphalt shingle from the knives after the shingle has been cut from the web. The bumper strips are mounted on the periphery of the cylinder and are used to provide traction for the web to maintain tension on the web as the web passes under the anvil roll.

Figure 2:
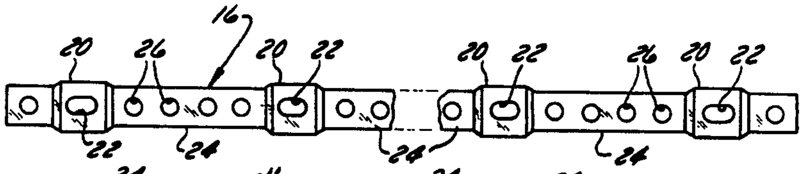
FIG. 2 is a plan view of the backing strip according to the invention.
Figure 3:
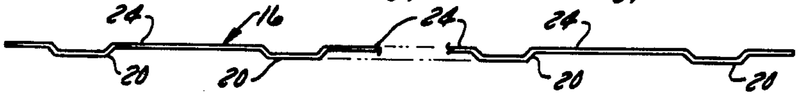
FIG. 3 is a side view of a portion of the metal backing strip showing the bridges.

In accordance with the invention, the rubber bumper strips 14 include a metal backing strip 16 and a rubber bumper 18. The metal backing strip 16 as seen in FIGS. 2 and 3 is cut from an elongate strip of metal and is provided with a series of mounting sections 20 having mounting holes 22. The mounting sections 20 are placed in abutting relation to the cylinder 10 and are interconnected by means of bridges 24 each of which includes a plurality of perforations 26. The bridges 24 are spaced from the plane of the mounting sections a distance sufficient to allow for the free flow of rubber around the bridges and through the perforations 26. A distance of at least 3/32 of an inch has been found sufficient to provide adequate strength to hold the metal strip. In this regard it should be noted that the bridges are narrower then the width of the mounting sections.

Figure 6:
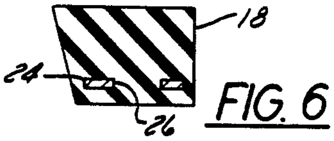
FIG. 6 is a section view taken on line 6—6 of FIG. 4 showing the metal strip encapsulated in the rubber bumper.
Figure 7:
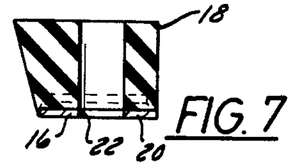
FIG. 7 is a section view taken on line 7—7 showing the opening for the mounting section.
Figure 4:
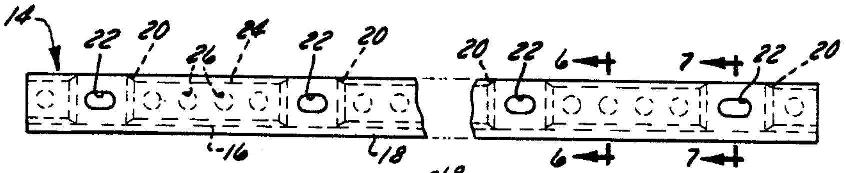
FIG. 4 is a top view of the rubber mounting strip.
Figure 5:
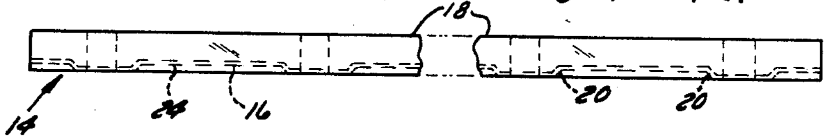
FIG. 5 is a side view of the rubber mounting strip showing the backing strip bonded to and encapsulated within the rubber bumper.

The rubber bumper strip is thus formed by molding the rubber bumper 18 to the backing strip 16 with the rubber material flowing around the bridges 24 and through the perforations 26. The rubber material is vulcanized so that it will bond to the surface of the mounting section 20, FIG. 7, as well as to both the front and back surfaces of the bridges, FIG. 6. When the bumper strip is mounted on the cylinder 10, the mounting sections 20 will be in contact with the cylinder and the bridges will be spaced from the cylinder. With this arrangement, the rubber material cannot be extruded from the backing strip when the mounting sections are screwed onto the cylinder.

The method of forming the rubber bumper mounting strip includes the steps of:

forming an elongate backing strip having a number of mounting sections interconnected by narrow bridges, stamping the metal strip to offset the bridges from the plane of the mounting sections and simultaneously perforating the bridges, molding a rubber bumper onto the mounting sections with the narrow bridges encapsulated in the rubber bumper, and vulcanizing the rubber bumper to bond the rubber bumper to the metal backing strip.

I claim:

1. A rubber bumper strip for stripping shingles from the knives on an asphalt shingle cutting cylinder, said strip comprising

- an elongate metal backing strip having a number of mounting sections located at spaced intervals,
- bridge means interconnecting the mounting sections, said bridge means having a width less than the width of the mounting sections, and
- a rubber bumper molded to the backing strip with said rubber bumper molded to the surface of said mounting sections and completely encapsulating said bridge means.

2. The rubber bumper strip according to claim 1 wherein said bridge means includes

- a plurality of perforations to allow the rubber bumper to flow through said bridge means.

3. A rubber bumper strip for stripping shingles from the knives on an asphalt shingle cutting cylinder, said strip comprising

- a metal backing strip having a number of mounting sections, each mounting section including a mounting hole, and a bridge between said mounting sections, each of said bridges including a number of perforations and having a width less than the width of said mounting sections, said bridges being offset from the plane of the mounting sections, and a rubber material molded to said backing strip to form a bumper on said mounting sections and to encapsulate said bridges in said rubber bumper.

* * * * *